United States Patent
Osanai

(10) Patent No.: US 11,587,345 B2
(45) Date of Patent: Feb. 21, 2023

(54) IMAGE IDENTIFICATION DEVICE, METHOD FOR PERFORMING SEMANTIC SEGMENTATION, AND STORAGE MEDIUM

(71) Applicant: HONDA MOTOR CO., LTD., Tokyo (JP)

(72) Inventor: Atsuki Osanai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 17/380,129

(22) Filed: Jul. 20, 2021

(65) Prior Publication Data

US 2022/0027688 A1    Jan. 27, 2022

(30) Foreign Application Priority Data

Jul. 22, 2020  (JP) .............................. JP2020-125627
Jul. 16, 2021  (JP) .............................. JP2021-118014

(51) Int. Cl.

| G06K 9/62 | (2022.01) |
| G06K 9/72 | (2006.01) |
| G06K 9/46 | (2006.01) |
| G06V 30/262 | (2022.01) |
| G06V 10/40 | (2022.01) |
| G06V 10/75 | (2022.01) |
| G06N 3/02 | (2006.01) |

(52) U.S. Cl.
CPC ......... *G06V 30/274* (2022.01); *G06K 9/6232* (2013.01); *G06K 9/6257* (2013.01); *G06V 10/40* (2022.01); *G06V 10/751* (2022.01); *G06N 3/02* (2013.01)

(58) Field of Classification Search
CPC .... G06V 30/274; G06V 10/40; G06V 10/751; G06K 9/6232; G06K 9/6257; G06N 3/02
See application file for complete search history.

(56) References Cited

U.S. PATENT DOCUMENTS

| 2019/0171930 A1* | 6/2019 | Lee | G06N 3/04 |
| 2021/0383203 A1* | 12/2021 | Kim | G06N 3/08 |
| 2022/0188345 A1* | 6/2022 | Onkar | G06N 3/084 |

FOREIGN PATENT DOCUMENTS

| JP | 2019-128804 | 8/2019 |
| WO | 2008/129881 | 10/2008 |

* cited by examiner

*Primary Examiner* — David F Dunphy
(74) *Attorney, Agent, or Firm* — Amin, Turocy & Watson, LLP

(57) ABSTRACT

An image identification device includes an image acquisition unit configured to acquire an image, a feature value extraction unit configured to extract a plurality of feature values of the acquired image, a feature map creation unit configured to create a feature map for each of the plurality of feature values, and a multiplication unit configured to multiply each of the feature maps by a weighting factor that is an arbitrary positive value indicating a degree of importance of a feature.

6 Claims, 8 Drawing Sheets

FIG. 5

| Method | MG | CFA | Aux | MS+Flip | mIoU% |
|---|---|---|---|---|---|
| FCN-50 | | | | | 71.38 |
| FCN-50 | ✓ | | | | 77.90 |
| CFANet-50 | ✓ | ✓ | | | 78.90 |
| CFANet-50 | ✓ | ✓ | ✓ | | 79.46 |
| CFANet-101 | ✓ | ✓ | ✓ | | 81.54 |
| CFANet-101 | ✓ | ✓ | ✓ | ✓ | 82.33 |

FIG. 7

| Method | BackBone | mIoU% |
|---|---|---|
| PSPNet [9] | ResNet101 | 82.6 |
| DANet [4] | | 82.6 |
| EncNet [7] | | 82.9 |
| CFNet [8] | | 84.2 |
| CFANet (ours) | ResNet101 | 84.5 |

IMAGE IDENTIFICATION DEVICE, METHOD FOR PERFORMING SEMANTIC SEGMENTATION, AND STORAGE MEDIUM

CROSS-REFERENCE TO RELATED APPLICATION

Priority is claimed on Japanese Patent Applications Nos. 2020-125627 filed on Jul. 22, 2020 and 2021-118014 filed on Jul. 16, 2021, the contents of which are incorporated herein by reference.

BACKGROUND OF THE INVENTION

Field of the Invention

The present invention relates to an image identification device, a method for performing semantic segmentation, and a storage medium.

Description of Related Art

Semantic segmentation is a basic yet difficult task that is intended to identify the category of an individual pixel and is required to have high accuracy to construct systems of autonomous mobile robots and automated driving. In actual environments, the capability of identifying different categories having similar appearances is required in addition to robustness to factors such as a scale of an object, a lighting environment, and occlusion. For this reason, feature values that can be identified with higher accuracy need to be acquired and selected to realize highly accurate recognition (e.g., refer to Japanese Unexamined Patent Application, First Publication No. 2019-128804 (which will be referred to as Patent Document 1 below) and Republished WO 2008/129881 (which will be referred to as Patent Document 2 below)).

Semantic segmentation using deep learning has seen great improvements with the combination of context information. As a recent technique for ascertaining context, a technique of correcting a feature value obtained from a feature extractor (backbone) using a similarity at a pixel level or a category level has been proposed.

SUMMARY OF THE INVENTION

However, in the related art, because feature values input to a network that is responsible for final classification are equally handled for each of feature maps, there is a problem that it is hard to distinguish the feature maps from each other. In addition, in the related art in which feature maps are augmented using a residual structure, a structure that allows only augmentation is employed, which has the problem of identification properties.

An aspect of the present invention has been conceived taking the above-described problems into consideration and aims to provide an image identification device, a method for performing semantic segmentation, and a storage medium that can compute a more accurate degree of importance than in the related art.

In order to solve the above-described problems, the present invention has adopted the following aspects.

(1) An image identification device according to an aspect of the present invention includes an image acquisition unit configured to acquire an image, a feature value extraction unit configured to extract a plurality of feature values of the acquired image, a feature map creation unit configured to create a feature map for each of the plurality of feature values, and a multiplication unit configured to multiply each of the feature maps by a weighting factor that is an arbitrary positive value indicating a degree of importance of a feature.

(2) According to the aspect (1) described above, the weighting factor is calculated from a process of convolving the image to create a convolution layer, a process of applying an ReLU function to the convolution layer to compute a feature value, and a process of applying a Global Average Pooling layer to the feature value.

(3) In order to achieve the above-described objective, an image identification device according to an aspect of the present invention includes an image acquisition unit configured to acquire an image, a feature value extraction unit configured to extract a plurality of feature values of the acquired image, a creation unit configured to create a feature map by performing a convolution on each of the plurality of feature values, and a weighted feature value generation unit configured to calculate a modified feature value by performing convolution on the feature map, aggregate contexts by performing global average pooling on the calculated modified feature value, generate an attention that is a weighting factor of each channel, multiply the generated attention by the feature map, perform augmentation and attenuation weighting on the plurality of feature maps, and thus generate a weighted feature value.

(4) In addition, the image identification device according to an aspect of the present invention may further include a first loss calculation unit configured to calculate an output by performing a convolution and upsampling on the weighted feature value, compare the calculated output with training data, and thus calculate a first loss, and a second loss calculation unit configured to calculate an output by performing a convolution and upsampling on the feature maps, compare the calculated output with training data, and thus calculate a second loss, in which all loss functions are calculated using the first loss and the second loss, and learning of the weighting factor may be performed using the calculated loss functions.

(5) A method for performing semantic segmentation according to an aspect of the present invention is a method for performing semantic segmentation of an image using a neural network system, the method including a process of inputting the image, a process of extracting a plurality of feature values of the acquired image, a process of creating a feature map for each of the plurality of feature values of the image, and a process of multiplying each of the feature maps by a weighting factor that is an arbitrary positive value indicating a degree of importance of a feature.

(6) A program according to an aspect of the present invention causes a computer to acquire an image, extract a plurality of feature values of the acquired image, create a feature map for each of the plurality of feature values of the image, and multiply each of the feature maps by a weighting factor that is an arbitrary positive value indicating a degree of importance of a feature.

According to the aspects (1) to (6) described above, a more accurate degree of importance than in the related art can be computed.

BRIEF DESCRIPTION OF THE DRAWINGS

FIG. 5 is a diagram showing evaluation results for a PASCAL VOC 2012 validation set.

FIG. 7 is a diagram showing an example of results of visualization of cosine similarities.

DETAILED DESCRIPTION OF THE INVENTION

An embodiment of the present invention will be described below with reference to the accompanying drawings.

Overview of Embodiment

A mechanism that augments or attenuates a degree of the influence of each feature map by using a feature value multiplied by a degree of importance of the feature map is used to make it easy to identify a feature map that contributes to an output. When a degree of importance of a feature map is computed, a Global Average Pooling layer for capturing context of an entire image is used. A structure in which a more accurate degree of importance is calculated is configured by installing a Head network in which auxiliary inference is performed on a branch that computes a degree of importance.

In the present embodiment, a context-aware feature attention network (CFANet) is used to solve these problems. In the CFANet, context is aggregated using Global Average Pooling (GAP) and attention of each channel is generated. The obtained attention is directly multiplied by a feature map and each feature map is weighted in both directions of augmentation and attenuation. Thus, greater identifying properties than in conventional methods can be acquired.

[Configuration Example of Image Identification Device 1]

Figure 1:
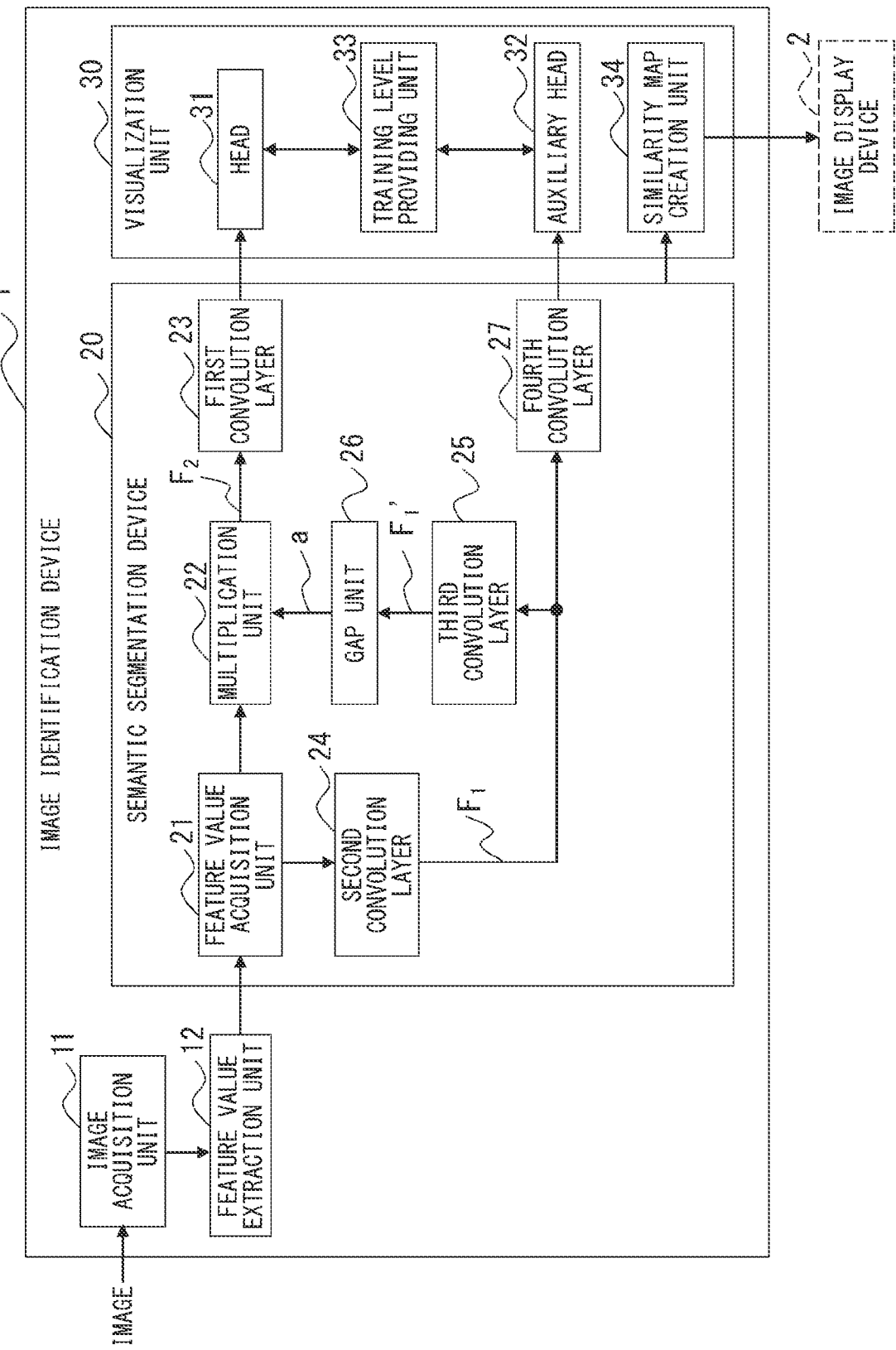
FIG. 1 is a block diagram illustrating a configuration of an image identification device including a semantic segmentation device according to an embodiment.

FIG. 1 is a block diagram illustrating a configuration of an image identification device 1 including a semantic segmentation device 20 according to the present embodiment. The image identification device 1 includes an image acquisition unit 11, a feature value extraction unit 12, the semantic segmentation device 20, and a visualization unit 30. The semantic segmentation device 20 includes a feature value acquisition unit 21, a multiplication unit 22 (a feature map creation unit or a weighted feature value generation unit), a first convolution layer 23 (a first loss calculation unit), a second convolution layer 24 (a feature map creation unit or a creation unit), a third convolution layer 25 (a feature map creation unit or a weighted feature value generation unit), a GAP unit 26 (a feature map creation unit or a weighted feature value generation unit), and a fourth convolution layer 27 (a second loss calculation unit). The visualization unit 30 includes a Head 31 (a first loss calculation unit), an auxiliary Head 32 (a second loss calculation unit), a training level providing unit 33, and a similarity map creation unit 34.

[Example of Network Structure in which Context is Incorporated]

Figure 2:
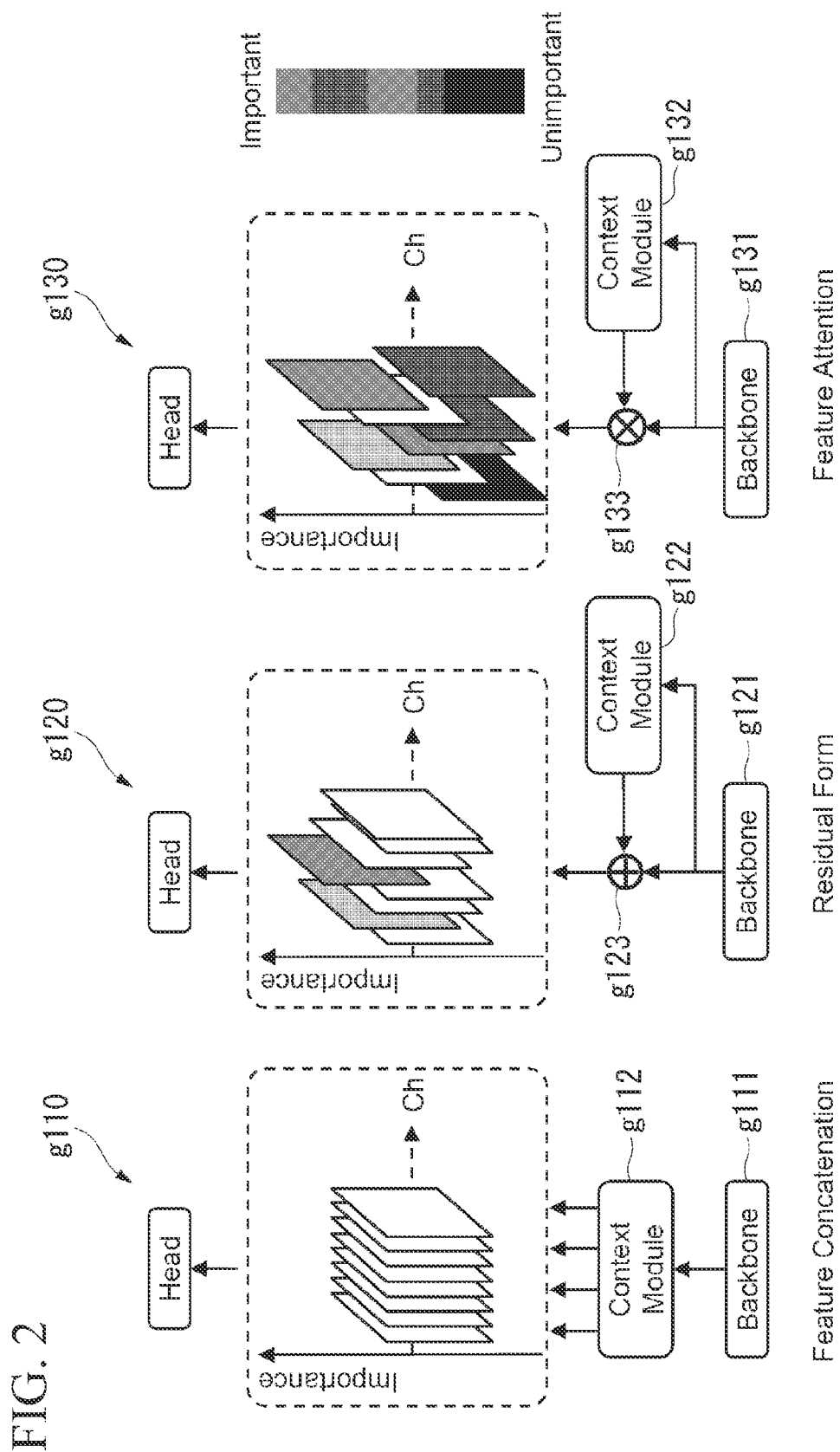
FIG. 2 is a diagram illustrating an example of a network structure in which context is incorporated.

Here, an example of a network structure that incorporates context will be described. FIG. 2 is a diagram illustrating an example of a network structure in which context is incorporated.

The image g110 in FIG. 2 illustrates an example of a structure in which feature values are combined in a channel direction. The image g120 in FIG. 2 illustrates a structure in which context is incorporated as residual feature values. The image g130 in FIG. 2 illustrates an example of a structure in which feature maps are modulated in both augmentation and attenuation directions taking context of the present embodiment into account.

[Network Structure]

Figure 3:
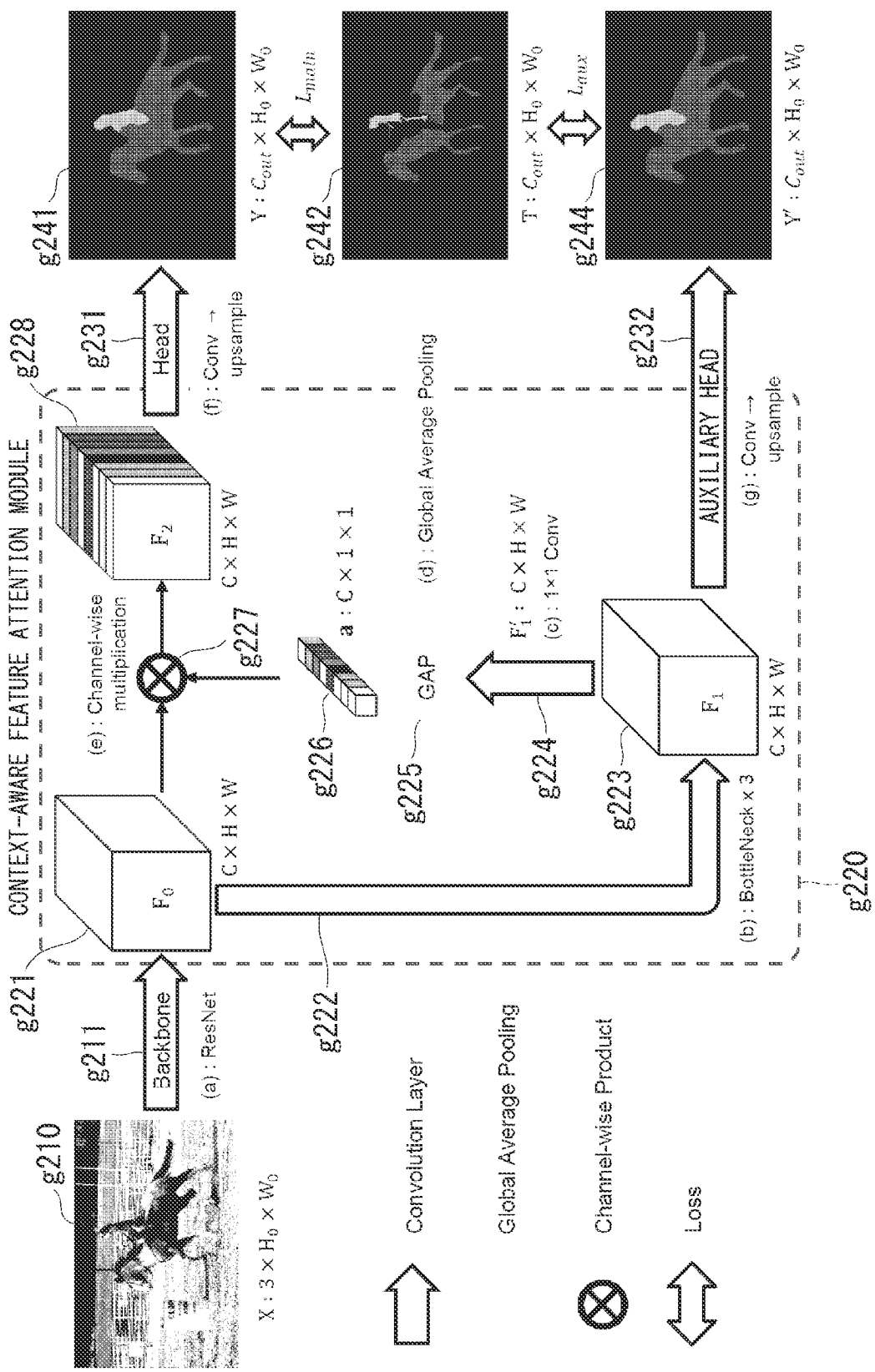
FIG. 3 is a schematic structure diagram of a CFANet according to an embodiment.

FIG. 3 is a schematic structure diagram of the CFANet according to the present embodiment. In the present embodiment, a ResNet is used as Backbone. Similar to Reference 1 (Zhao, h., Shi, J., Qi, X., Wang, X., and Jia, J., "Pyramid Scene Parsing Network", CVPR, 2017), dilated convolution is applied to the final two blocks of the ResNet, and a reduction in resolution is suppressed to ⅛ of an input image. A feature value $F_0$ obtained from the Backbone is propagated to a CFA module indicated by the dashed line. $F_0$ is converted into $F_1$ through the convolution layers and then is propagated in the two directions. A first direction is toward a network for generating attention at a channel level.

The feature map obtained from the Backbone is propagated to the CFA module as described above, weighted for each channel, and then taken to the Head.

After $F_1$ passes through a Convolution-BatchNorm-ReLU layer, it causes global context to be aggregated through Global Average Pooling (GAP) and is converted into attention a for each channel. Specifically, attention ac for a certain channel c is indicated as in the following expression (1).

[Math. 1]

$$a_c = \frac{\alpha}{HW} \sum_{u=0}^{W-1} \sum_{v=0}^{H-1} F'_{1,(c,v,u)} \qquad (1)$$

Here, H represents a height, W represents a width, a∈R represents a scale factor adapted by learning, and $F_1'$ represents a feature value after ReLU (modified feature value). u=(c, v, u) is set, v represents a row direction, u represents a column direction, and the sum of these is used for the entire feature maps. A feature value $F_2$ weighted in consideration of context is expressed by the following expression (2).

[Math. 2]

$$F_{2,(c,v,u)} = a_c F_{0,(c,v,u)} \qquad (2)$$

The obtained $F_2$ is input to the Head to obtain an output Y.

Another propagation direction of $F_1$ is toward the auxiliary Head and an auxiliary output Y' is obtained therefrom. Each of the outputs and a training level T are compared to obtain losses $L_{main}$ (first loss) and $L_{aux}$ (second loss). A function for all of the losses is defined by the following expression (3).

[Math. 3]

$$L = L_{main} + L_{aux} \qquad (3)$$

[Characteristics of CFA Module]

Figure 4:
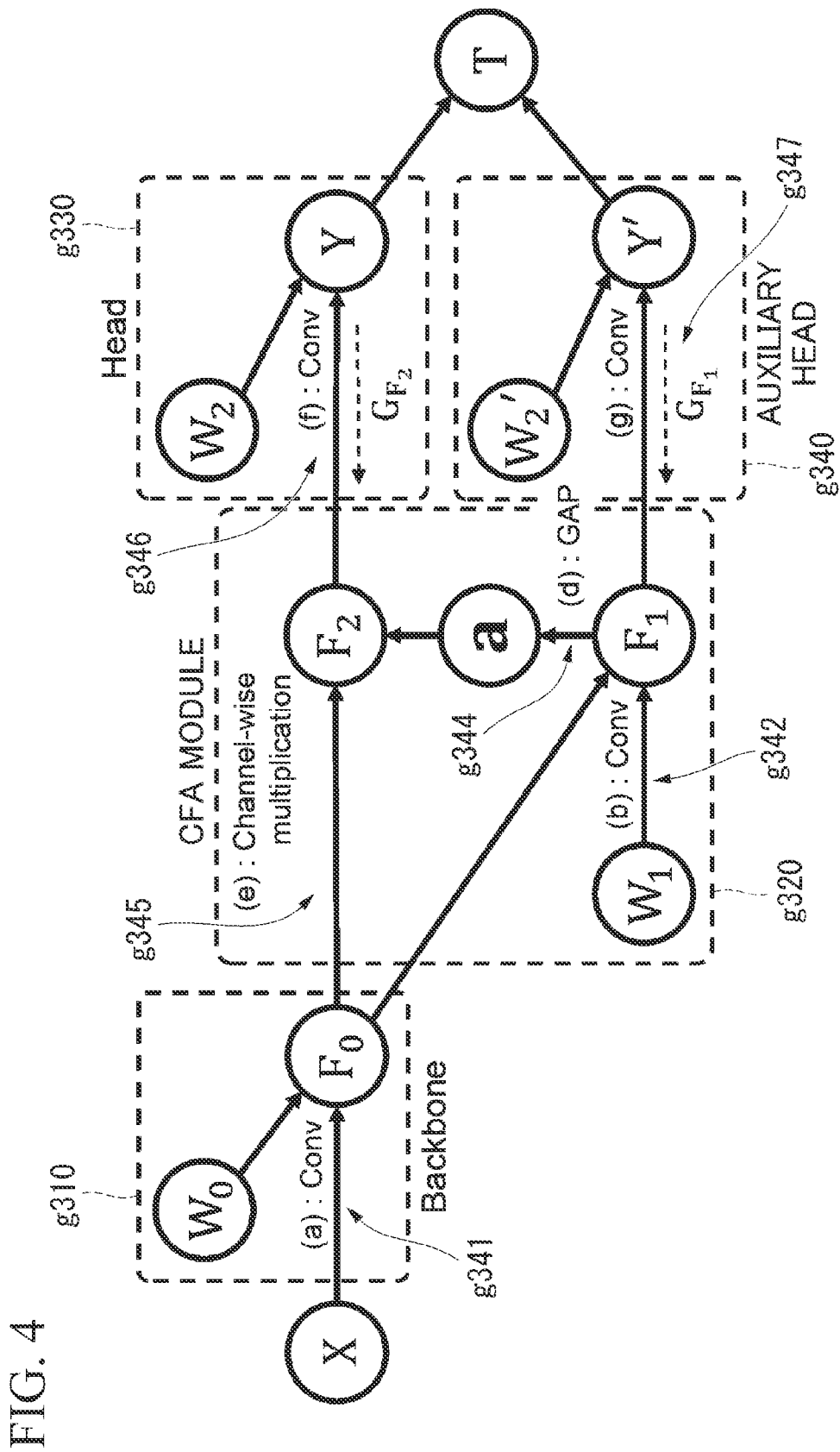
FIG. 4 is a graph of calculation in which the CFANet according to the embodiment is simplified.

Next, the equivalence of the CFANet and a mixture-of-experts model and effects of the auxiliary Head that branches from the CFA module will be described. For the sake of brevity of the description, a graph of calculation in which the CFANet illustrated in FIG. 4 is simplified will be considered. FIG. 4 is a graph of calculation in which the CFANet according to the present embodiment is simplified. In FIG. 4, all activation functions are set as linear functions. The convolution layers illustrated in (c) of FIG. 3 are omitted. Generality of the discussion is not lost with these assumptions. In FIG. 4, each F represents a feature value, and each W represents a weighing matrix of convolution. a represents attention for each channel, and X, Y, and T represent correct labels corresponding to an input image, an inference result, and an input, respectively. A variable of the auxiliary Head is denoted with an apostrophe (') attached thereto.

[Mixture-of-Experts Model]

The mixture-of-experts model is constituted by C experts ($E, \ldots, E_{C-1}$) and a gating network G that generates a C-dimensional weight. For an input x, an output y is given according to the following expression (4).

[Math. 4]

$$y = \sum_{i=0}^{C-1} G(x)_i E_i(x) \quad (4)$$

Here, $G(x)_i$ represents a weight allocated to an expert $E_i$ of an index i.

In order to ascertain the equivalence of the mixture-of-experts model and the CFANet, the weighing matrix of the following expression (5) appearing in the Head of FIG. 4 will be considered first.

[Math. 5]

$$W_2 \in \mathbb{R}^{C \times k_2 \times k_2 \times C_{out}} \quad (5)$$

In the expression (5), $k_2$ represents a kernel size, C represents the number of input channels, and $C_{out}$ represents the number of output channels. The final output Y can be transformed into the following expression (6) using the expression (2).

[Math. 6]

$$Y_{(c,u,v)} = \sum_{i=0}^{C-1} \sum_{k_u,k_v=\lfloor -k_2/2 \rfloor}^{\lceil k_2/2 \rceil} W_{2,(i,k_v,k_u,c)} F_{2,(i,v+k_v,u+k_u)}$$

$$= \sum_{i=0}^{C-1} a_i \left( \sum_{k_u,k_v=\lfloor -k_2/2 \rfloor}^{\lceil k_2/2 \rceil} W_{2,(i,k_v,k_u,c)} F_{0,(i,v+k_v,u+k_u)} \right) \quad (6)$$

Here, a position dependence in a kernel is expressed by $k=(k_v, k_u)$.

When the expression (4) and the expression (6) are compared, it can be seen that the CFANet is equivalent to the mixture-of-experts model. As a result, the CFANet can be used to identify a target included in the input image by focusing on a feature value that is unique to it.

[Effects of Auxiliary Head]

The presence of the auxiliary Head provided on the CFANet indicates that learning of the weight $W_2$ in the CFA module is promoted. A gradient propagating back to a node $F_2$ from the output Y is set to $G_{F2}$, and a gradient propagating back to a node $F_1$ from the auxiliary output Y' is set to $G_{F1}$ (indicated by the dashed-line arrows in FIG. 4).

The total gradient propagating to the node $F_1$ is expressed by the following expression (7).

[Math. 7]

$$\frac{\partial L}{\partial F_{1,(c,v,u)}} = \frac{1}{HW} \sum_{u'=0}^{W-1} \sum_{v'=0}^{H-1} G_{F_2,(c,v',u')} F_{0,(c,v',u')} + G_{F_1,(c,v',u')} \quad (7)$$

As a result of generating attention for each channel using GAP, dependence of u=(c, u, v) only appears in the second term. If a gradient of the weight $W_1$ is obtained using chain rules, the following expression (8) is obtained.

[Math. 8]

$$\frac{\partial L}{\partial W_{1,(i,k_u,k_v,j)}} = \frac{1}{HW} \left( \sum_{u,u'=0}^{W-1} \sum_{v,v'=0}^{H-1} G_{F_2,(j,v',u')} F_{0,(j,v',u')} + F_{0,(i,v+k_v,u+k_u)} \right) + \quad (8)$$

$$\sum_{u=0}^{W-1} \sum_{v=0}^{H-1} G_{F_1,(j,v,u)} F_{0,(i,v+k_v,u+k_u)}$$

The first term of the expression (8) can be written approximately as the following expression (9).

[Math. 9]

$$\sum_{u=0}^{W-1} \sum_{v=0}^{H-1} F_{0,(i,v+k_v,u+k_u)} \approx \sum_{u=0}^{W-1} \sum_{v=0}^{H-1} F_{0,(i,v,u)} \quad (9)$$

In other words, if the auxiliary Head is not used ($G_{F1}=0$), the dependence of k ($k_v$, $k_u$) completely disappears from the expression (8), which hinders learning of the weight $W_1$. The installation of the auxiliary Head restores the dependence and leads to acquisition of a more identifiable feature value.

[Test Results]

The results obtained by evaluating the CFANet with the PASCAL VOC 2012 dataset (Reference 2: Everingham, M., Eslami, S. M. A., Van Gool, L., Williams, C. K. I., Winn, J., and Zisserman, A., "The Pascal Visual Object Classes", (VOC) Challenge, International Journal of Computer Vision, 2010, p 303-338) will be described below. For the evaluation index, the average value of IoUs of classes (mIoU) was used.

PASCAL VOC 2012 is a data set constituted by 1464 pieces of training data, 1449 pieces of validation data, and 1456 pieces of test data, and includes categories with 21 classes including a background class. In addition to the PASCAL VOC 2012 dataset, an SBD dataset in which 10582 images extracted from the PASCAL VOC 2011 dataset have been annotated for checking (Reference 3: Hariharan, B., Arbelaez, P., Bourdev, L., Maji, S., and Malik, J., "Semantic Contours from Inverse Detectors", ICCV, 2011) was also used for learning.

SGD was used for optimization, the momentum was set to 0.9, and the weight attenuation was set to 0.0001. For scheduling of a learning rate, a method of multiplying the initially set learning rate by $(1-\text{iter}/(\text{total-iter})^{0.9}$ according to Reference 1 was used. Learning was performed over 50 epochs with the SBD dataset for pre-learning, and fine tuning was performed over 50 epochs on the PASCAL VOC 2012 dataset using the weight as an initial value. The learning rates of the pre-learning and fine tuning were 0.0015 and 0.00015, respectively.

For data dilation, random scaling in the range of [0.5, 2.0] random horizontal flipping, and random cropping in the size of 513×513 were applied. In addition to evaluation with a single scale, results obtained from horizontally flipped and multi-scaled input images were also evaluated.

Effects of three elements taken to the CFANet were separated using the PASCAL VOC 2012 validation set. First, an FCN on which ResNet50 as a baseline is set as the backbone was evaluated and the accuracy of 71.38% was obtained. On the other hand, as a result of applying a multi-grid in which dilation of three 3×3 convolution layers included in the final block of ResNet was set to (4, 8, 16) (Reference 4; Chen, L-C., Papandreou, G., Schroff, F., and Adam, H., "Rethinking atrous Convolution for Semantic Image Segmentation", ArXiv: 1706.05587, 2017), the accuracy improved up to 77.90%. This can be interpreted to mean that the effects were obtained due to the widened receptive fields.

The addition of the CFA module that is the technique of the present embodiment increased the performance up to 78.90%. The result can be understood to mean that the CFA module appropriately inferred the degree of importance for each channel based on the global context. By further adding the above-described auxiliary Head, the weights in the CFA module were effectively learned, and the performance was improved up to 79.46%. When the backbone was changed to ResNet 101 for further improvement, the performance was improved up to 81.54%, and performance of 82.33% was finally achieved by performing inference using flipping and MS.

FIG. 5 is a diagram showing the evaluation results for the PASCAL VOC 2012 validation set. In FIG. 5, MG represents a multi-grid, CFA represents the CFA module, Aux represents the auxiliary Head, and MS+Flip represents multi-scaling and an input of horizontal flip.

[Visualization of Feature Similarity]

In order to facilitate understanding of the effects of the CFA module, the visualization unit 30 visualizes a cosine similarity in the space of a feature value between a target pixel and other pixels. As a target to be visualized, a feature value input to the head ($F_2$ of FIG. 3) is focused on. A similarity of the feature values immediately before the Head on the FCN is also visualized as a comparison target.

Figure 6:
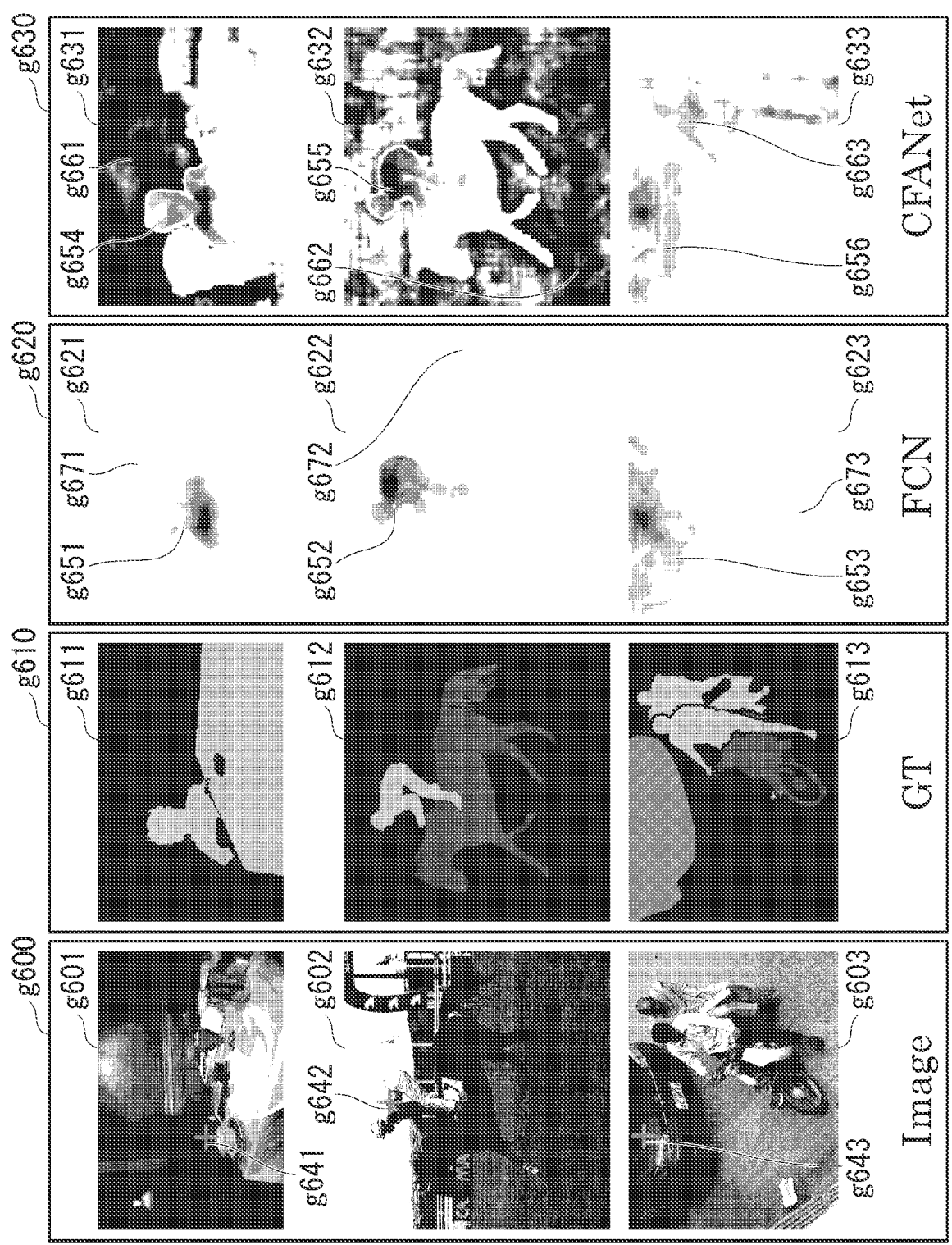
FIG. 6 is a diagram illustrating evaluation results for a PASCAL VOC 2012 test set.

FIG. 6 is a diagram showing an example of results of visualization of cosine similarities.

A square g600 in FIG. 6 (including g601 to g603 from the top) indicates input images in which pixels that are subject to calculation of a similarity are marked with crosses (g641 to g643).

A square g610 in FIG. 6 (including g611 to g613 from the top) indicates correct labels corresponding to the input images.

A square g620 in FIG. 6 (including g621 to g623 from the top) and a square g640 in FIG. 6 (including g631 to g633 from the top) indicate similarity maps of the FCN as the baseline and the CFANet that is the technique of the embodiment.

In the similarity map, a pixel having a color close to red (g651 to g656) indicates a high similarity, and a pixel having a color close to blue (g661 to g663) indicates a low similarity. While, in the FCN, the area of the same object as a target pixel indicates a high similarity, the area of an object other than the same object, such as the background, indicates a relatively high similarity (green to yellow) (g671 to g673).

On the other hand, it is ascertained that, in the CFANet of the embodiment, an area that is irrelevant to the target area is more easily identifiable. This indicates that, while the FCN handles even an unimportant feature map as having a degree of contribution equal to that of other maps, the CFANet exhibits an effect of reducing contribution of such a feature map and increasing a degree of contribution of an important channel. These effects lead to improvement in the performance and further enhancement in the identifying properties.

[Comparison in Performance with Existing Technique]

The performance of the CFANet was compared with that of an existing technique. The comparison was performed using a PASCAL VOC 2012 test set. This test set receives only input images and employs a fair evaluation method that is implemented by sending a result inferred using its own model to an evaluation server. For the evaluation with the test set, the model learned using the SBD data set was finely tuned for PASCAL VOC 2012 training plus validation sets. The results are shown in FIG. 7. FIG. 7 is a diagram illustrating evaluation results for a PASCAL VOC 2012 test set. The CFANet according to the embodiment achieved an accuracy rate of 84.5% exceeding that of the existing method.

As described above, the CFANet with the mechanism in which feature maps are weighted using attention at a channel level is used in the present embodiment. According to the test results, it is ascertained that the CFANet handles feature maps more identifiably than in the conventional technique through visualization of the feature maps. Remarkable improvement can be achieved not only in enhancement in identifying properties but also the performance, and higher accuracy in PASCAL VOC 2012 test sets than in the conventional technique can be achieved.

Here, an example of a network structure in which contexts are incorporated will be further described with reference to FIG. 2. Dependency of a channel dimension will be focused on here.

In the structure in which feature values of the image g110 are combined in the channel direction, feature values extracted from the image by a backbone g111 are input to a context module g112. In this structure, the feature values are combined in the channel direction regardless of their degrees of importance.

The backbone uses ResNEet (Reference 1) learned in advance in, for example, ImageNet (Reference 5; Deng, J. Dong, W., Socher, R., Li, L. J., Li, K., Fei-Fei, L., "ImageNet: A large-scale hierarchical image database", In: CVPRO9, 2009). In the present embodiment, for example, a first 7*7 convolution is replaced with a 3*3 convolution layer following PSPNet and an extended convolution is used in the first two blocks of ResNet, and thus the number of output slides of the feature map is eight.

In a structure in which a context of the image g120 is incorporated as a residual feature value, feature values extracted from the image by a backbone g121 are input to a context module g122 and a calculation unit g123. In this structure, important feature values are emphasized and combined in the channel direction. Further, the calculation unit g123 (element-wise summation) performs addition to the feature values obtained by the backbone g121 and the context module g122 for the elements. In other words, in a residual format, expression of each pixel is augmented by aggregating contexts in units of pixels.

In a structure in which a feature map is modulated in augmentation and attenuation directions taking the context of the image g130 into consideration, feature values extracted from the image by a backbone g131 are input to a context module g132 and a calculation unit g133. In this structure, feature values with a high degree of importance are emphasized, feature values with a low degree of importance are attenuated, and they are combined in the channel direction. Further, the calculation unit g133 (channel-wise multiplication) obtains the product of each channel. In this configuration, a weight of each feature map can be adjusted by focusing on features. Thus, relevant features can be identified more easily in this configuration.

An objective of semantic segmentation is to assign a meaningful category to each pixel. In semantic segmentation, classification becomes ambiguous as the number of categories becomes greater. For this reason, a model needs to be learned to select a feature that can be identified with higher accuracy for higher-quality image segmentation.

However, in the structure (g110) in which feature values are combined in the channel direction, those aggregated features are handled by a head network with equal importance, and thus it is difficult to identify a more characteristic specific feature.

In the recent context modeling approach, features of a backbone have been improved using a similarity map at a pixel level. A structure (g120) in which contexts are incorporated as residual feature values employs a residual format. However, this structure is reinforced only by selected features, and thus accuracy in identification of a feature is limited.

A CFA module (Context-aware Feature Attention Network (CFANet)) with the configuration of FIG. 3 is thus used in the present embodiment.

CFANet adopts a Context-aware Feature Attention (CFA) module that adaptively adjusts a degree of importance of a context-aware individual feature. Using a global context is essential for accurate segmentation. For this reason, the present embodiment is for the purpose of aggregating global features and directly generating channel-wise attention using global average pooling (GAP).

According to this configuration, individual feature maps can be strengthened or weakened using corresponding attention weights, as illustrated in the image g130 in FIG. 2. Thus, the attention weights can have positive values according to the present embodiment, and thus each feature can be distinguished and handled with more convenience than in other techniques.

Next, a schematic configuration of CFANet will be further described with reference to FIG. 3.

An individual feature map of a backbone network represents features of a certain type with objects and staff present in an input image. In order to distinguish a characteristic pattern corresponding to the category of a target object among the features, a corresponding feature needs to be handled with more importance based on a context of a scene. Thus, the present embodiment employs the CFA module to perform re-prioritization.

The dimensions of an acquired image X (g210) are $3*H_0*W_0$. Here, 3 represents the number of channels, H represents a height of a feature map, and W represents a width of a feature map.

ResNet is used, for example, for the backbone g211 as described above. The backbone g211 extracts a backbone feature value $F_0$ ($\in R$ (R is a double-line character and the set of all real numbers)$^{C*H*W}$) (g221). Here, C represents the number of channels.

A CFA module g220 converts the backbone feature value $F_0$ into a backbone feature map $F_1$ ($\in R^{C*H*W}$) g223 using convolution layers.

Next, the CFA module g220 performs a 1*1 convolution (g224) for the feature map $F_1$ to calculate a modified feature value $F_1'$.

Next, the CFA module g220 performs global average pooling (GAP) (g225) on the modified feature value $F_1'$ to generate attention a (C*1*1) (g226) for each channel. Next, the CFA module g220 generates channel-wise attention (g227) by aggregating global features using the backbone feature value $F_0$ and the attention a. In this processing, a weighted feature value $F_2$ ($\in R^{C*H*W}$) (g228) is generated by multiplying the attention a by the backbone feature value $F_0$ for each channel.

The auxiliary Head 32 (g232) performs, for example, a convolution and upsampling on the modified feature value $F_1'$ to calculate and output an output Y' ($C_{out}*H_0*W_0$) (g244).

The Head 31 (g231) performs, for example, a convolution and upsampling on a weighted feature value $F_2$ to calculate and output an output Y ($C_{out}*H_0*W_0$) (g241).

The image identification device 1 compares a training label T ($C_{out}*H_0*W_0$) (g242) with the output Y (g241) to calculate a loss $L_{main}$. In addition, the image identification device 1 compares the training label T ($C_{out}*H_0*W_0$) (g242) with the output Y' (g244) to calculate a loss $L_{aux}$.

Next, a calculation graph in which CFANet is simplified will be further described with reference to FIG. 4 in which CFANet is expressed in a simple form. Further, in FIG. 4, the convolution layers of FIG. 3 (g224, etc.) are omitted on the assumption that all activation functions are linear. Further, although the convolution layers of FIG. 3 (g224, etc.) are omitted for simplification in FIG. 4, the description maintains generality.

A backbone g310 receives an input of the input image X. The backbone g310 performs a convolution g341 using a weight $W_0$ to calculate the backbone feature value $F_0$.

A CFA module g320 performs a convolution g344 on the backbone feature value $F_0$ using a weight $W_1$ to calculate the modified feature value $F_1$.

The CFA module g320 calculates the attention a through GAP (g344).

The CFA module 320 obtains the product of each channel using the attention a and the backbone feature value $F_0$ and calculates a weighted feature value $F_2$ (g345).

Further, in order to maintain the resolution of the feature map, the CFA module g320 does not perform downsampling.

The Head 31 (g330) performs a convolution (g346) on the weighted feature value $F_2$ using a weight $W_2$ to calculate and output an output Y.

The auxiliary Head 32 (g340) performs a convolution (g347) on the modified feature value $F_1$ using a weight $W_2'$ to calculate and output an output Y'.

Further, formulas and calculation methods used for calculating the feature values, attention, and the like described in FIGS. 3 and 4 are as described above.

Further, in the present embodiment, the Head 31 and the auxiliary Head 32 employ the network constituted by convolution layers and drop-out layers. In addition, in the present embodiment, the deep supervision head proposed for PSPNet, for example, is employed for the second to last block of ResNet to facilitate optimization. In the present embodiment, three losses $L_{main}$, $L_{aux}$, and Las are calculated as described above, and the net loss is calculated using, for example, the following formula (10). Further, the loss Las is a loss to the segmentation output using the feature values of the middle layer of the backbone and is proposed for PSPNet.

[Formula 10]

$$L_{total} = L_{main} + L_{aux} + 0.4 \cdot L_{ds} \qquad (10)$$

Further, in formula (10), although the weight of the loss Las is set to 0.4 according to PSPNet, a weight is not limited thereto.

Further, the image identification device 1 uses a loss function or a total loss to learn an attention that is a weighting factor. Further, the image identification device 1 may be designed to use a loss function or a total loss to learn a weight used by the second convolution layer, a weight used by the third convolution layer 25, a weight used by the first convolution layer 23 and the Head 31, and a weight used by the fourth convolution layer 27 and the auxiliary Head 32.

[Processing Procedure]

Next, an example of a processing procedure of the image identification device 1 will be described.

Figure 8:
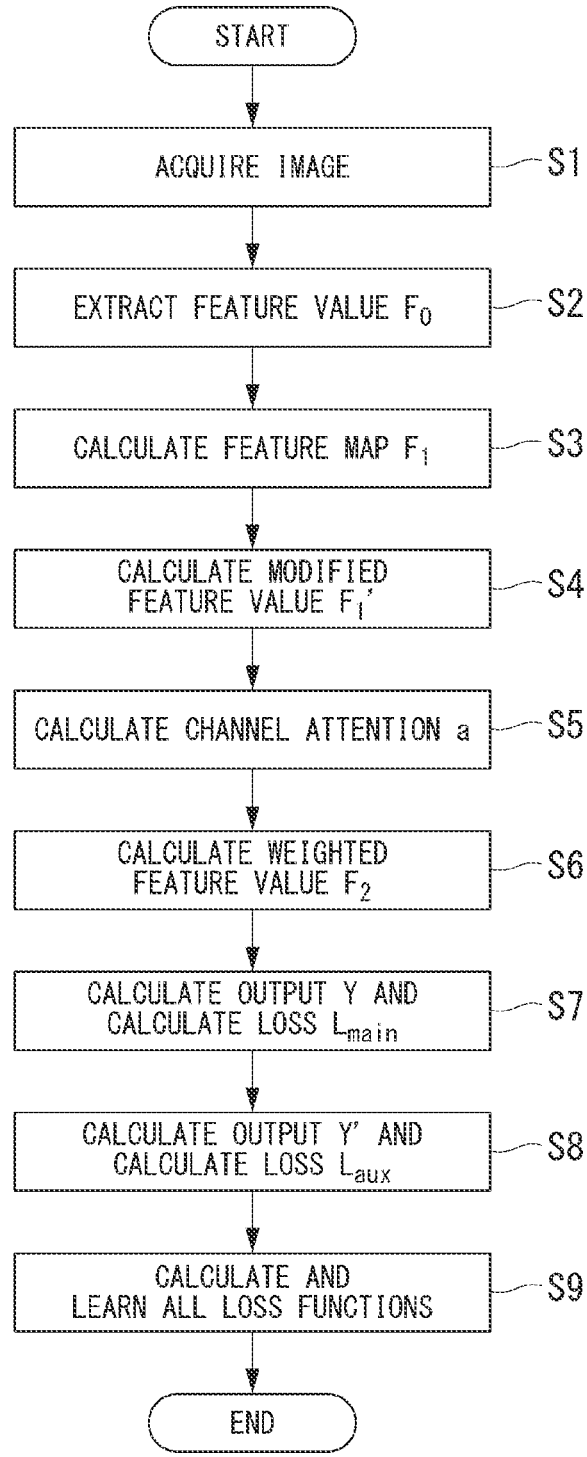
FIG. 8 is a flowchart of an example of a processing procedure of the image identification device according to an embodiment.

FIG. 8 is a flowchart of the example of the processing procedure of the image identification device 1 according to the present embodiment.

(Step S1) The image acquisition unit 11 acquires an image.

(Step S2) The feature value extraction unit 12 performs a convolution on the acquired image using the weight $W_0$ to extract the backbone feature value $F_0$.

(Step S3) The second convolution layer 24 performs a convolution on the backbone feature value $F_0$ using the weight $W_1$ to extract the feature map $F_1$.

(Step S4) The third convolution layer 25 performs a convolution on the feature map $F_1$ to calculate the modified feature value $F_1'$.

(Step S5) The GAP unit 26 performs global average pooling on the modified feature value $F_1'$ to calculate the attention a for each channel.

(Step S6) The multiplication unit 22 multiplies the attention a and the backbone feature value $F_0$ by each channel to calculate a weighted feature value $F_2$.

(Step S7) The first convolution layer 23 and the Head 31 perform, for example, a convolution and upsampling on the weighted feature value $F_2$ to calculate and output the output Y. The Head 31 calculates the loss $L_{main}$ using the output Y.

(Step S8) The fourth convolution layer 27 and the auxiliary Head 32 perform, for example, a convolution and upsampling on the modified feature value $F_1'$ to calculate and output the output Y'. Successively, the auxiliary Head 32 calculates the loss $L_{aux}$ using the output Y'.

(Step S9) The image identification device 1 calculates all loss functions using the loss $L_{main}$ and the loss L. and learns an attention using the calculated loss functions L.

Further, the above-described processing procedure is an example, and a processing procedure is not limited thereto. For example, several processing operations may be performed with balance, and the order of processing operations may be reversed. In addition, when learning is completed, calculation and learning processing on losses and loss functions may not be performed.

The idea of a feature attention for semantic segmentation has been reviewed above and the Context-aware Feature Attention (CFA) module for adjusting a degree of importance of a corresponding feature map based on global contexts is provided in the present embodiment. Further, CFANet is constructed by combining the FCN and the CFA module.

Thus, according to the present embodiment, accuracy in identification of feature maps can be improved by using the CFA module.

In addition, according to the present embodiment, it is possible to experimentally demonstrate that accuracy in sematic segmentation can be improved and an estimated weight indicates a degree of importance of a feature map.

Further, according to the present embodiment, distinguishment between feature values can be improved, and when similarities of feature values of pixels are compared, the regions can be distinguished more apparently than in the past.

In addition, according to the present embodiment, the improvement in distinguishment between pixels leads to easier visual recognition. According to the present embodiment, this technique can be applied to understanding of the ground for judgment, analysis of the cause of erroneous detection, and the like. Because a degree of importance of a feature map can be ascertained according to the present embodiment, a calculation time can be shortened by extracting only maps with higher degrees of importance. According to the present embodiment, the technique can be applied to pruning of channels by making degrees of importance sparse. According to the present embodiment, a distribution of degrees of importance tends to be sharper as an amount of learning data becomes greater (the reliability of degrees of importance becomes higher as an amount of data becomes greater). According to the present embodiment, by inputting new data and ascertaining a distribution using this tendency, it is possible to determine whether the data should be taught as training data. Thus, teaching costs can be reduced according to the present embodiment.

A network structure for calculating a degree of importance for each feature map (channel) is not limited to the above-described configuration and other configurations may be adopted. Further, although learning of the auxiliary classifying network is performed in the completely same task as the main task in the above-described example, an appropriate degree of importance can be calculated even when it is combined with another task (scene classification, edge detection, caption generation, etc.). In addition, a position of the CFA module and a position at which each functional unit of the CFA module or the like is inserted are not limited to the above-described positions, and may be other positions. In addition, although a degree of importance is set to have a positive value for improvement of interpretability in the above-described example, it may have a negative value.

A program for realizing all or some of the functions of the image identification device 1 according to the present invention may be recorded in a computer-readable recording medium and the program recorded in the recording medium may be read by a computer system to be executed to perform all or some of the processes performed by the image identification device 1. The "computer system" mentioned here may include an OS and hardware such as a peripheral apparatus. The "computer system" is assumed to also include a world wide web system with a homepage provision environment (or a display environment). The "computer-readable recording medium" refers to a portable medium such as a flexible disk, a magneto-optical disc, a ROM, a CD-ROM, and the like, and a storage device such as a hard disk built into the computer system. Moreover, the "computer-readable recording medium" may include a medium that retains a program for a certain time period, like a volatile memory (RAM) inside the computer system for functioning as a server or a client in a case in which the program is transmitted over a network such as the Internet or over a communication line such as a telephone line.

The program may be transmitted to another computer system from the computer system saving the program in a storage device, or the like via a transmission medium or by transmission waves in a transmission medium. Here, the "transmission medium" for transmitting the program refers to a medium with the function of transmitting information, such as a network (communication network) like the Internet or a communication line such as a telephone line. The program may realize some of the above-described functions. Furthermore, the program may be a so-called differential file (differential program) that can realize the above-described functions in combination with a program already recorded in the computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image identification device comprising:
   an image acquisition unit configured to acquire an image;
   a feature value extraction unit configured to extract a plurality of feature values of the acquired image;
   a feature map creation unit configured to create a feature map for each of the plurality of feature values; and
   a multiplication unit configured to multiply each of the feature maps by a weighting factor that is an arbitrary positive value indicating a degree of importance of a feature.

2. The image identification device according to claim 1, wherein the weighting factor is calculated from a process of convolving the image to create a convolution layer, a process of applying an ReLU function to the convolution layer to compute a feature value, and a process of applying a Global Average Pooling layer to the feature value.

3. An image identification device comprising:
   an image acquisition unit configured to acquire an image;
   a feature value extraction unit configured to extract a plurality of feature values of the acquired image;
   a creation unit configured to create a feature map by performing a convolution on each of the plurality of feature values; and
   a weighted feature value generation unit configured to calculate a modified feature value by performing convolution on the feature map, aggregate contexts by performing global average pooling on the calculated modified feature value, generate an attention that is a weighting factor of each channel, multiply the generated attention by the feature map, perform augmentation and attenuation weighting on the plurality of feature maps, and thus generate a weighted feature value.

4. The image identification device according to claim 3, further comprising:
   a first loss calculation unit configured to calculate an output by performing a convolution and upsampling on the weighted feature value, compare the calculated output with training data, and thus calculate a first loss; and
   a second loss calculation unit configured to calculate an output by performing a convolution and upsampling on the feature maps, compare the calculated output with training data, and thus calculate a second loss,
   wherein all loss functions are calculated using the first loss and the second loss, and learning of the weighting factor is performed using the calculated loss functions.

5. A method for performing semantic segmentation of an image using a neural network system, the method comprising:
   a process of inputting the image; a process of extracting a plurality of feature values of the acquired image;
   a process of creating a feature map for each of the plurality of feature values of the image; and
   a process of multiplying each of the feature maps by a weighting factor that is an arbitrary positive value indicating a degree of importance of a feature.

6. A computer-readable non-transitory storage medium storing a program causing a computer to:
   acquire an image;
   extract a plurality of feature values of the acquired image;
   create a feature map for each of the plurality of feature values of the image; and
   multiply each of the feature maps by a weighting factor that is an arbitrary positive value indicating a degree of importance of a feature.

* * * * *